(12) United States Patent
Murai

(10) Patent No.: US 10,467,934 B2
(45) Date of Patent: Nov. 5, 2019

(54) DISPLAY DEVICE

(71) Applicant: MITSUBISHI ELECTRIC CORPORATION, Tokyo (JP)

(72) Inventor: Hiroyuki Murai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/667,072

(22) Filed: Aug. 2, 2017

(65) Prior Publication Data

US 2018/0040268 A1 Feb. 8, 2018

(30) Foreign Application Priority Data

Aug. 8, 2016 (JP) .................................. 2016-155281

(51) Int. Cl.
| | |
|---|---|
| *G09G 3/00* | (2006.01) |
| *G02F 1/1335* | (2006.01) |
| *G02F 1/1362* | (2006.01) |
| *G09G 3/36* | (2006.01) |

(52) U.S. Cl.
CPC ....... *G09G 3/006* (2013.01); *G02F 1/133512* (2013.01); *G02F 1/133528* (2013.01); *G02F 1/136286* (2013.01); *G09G 3/36* (2013.01); *G02F 2202/28* (2013.01); *G09G 2300/026* (2013.01); *G09G 2310/08* (2013.01); *G09G 2330/023* (2013.01); *G09G 2330/12* (2013.01)

(58) Field of Classification Search
CPC ............. G09G 3/006; G09G 2300/026; G09G 2330/12
USPC ......................................................... 345/1.3
See application file for complete search history.

(56) References Cited

U.S. PATENT DOCUMENTS

| | | | | |
|---|---|---|---|---|
| 7,728,788 B1* | 6/2010 | Echols | ................. | G09G 3/2092 345/1.3 |
| 2006/0146256 A1* | 7/2006 | Ahn | .................. | G02F 1/134309 349/141 |
| 2013/0162504 A1 | 6/2013 | Kawano | | |
| 2015/0098019 A1* | 4/2015 | Takahashi | ............. | G06F 3/1446 348/502 |
| 2015/0205565 A1* | 7/2015 | Koguchi | ............... | G06F 3/1446 345/1.3 |
| 2016/0162247 A1* | 6/2016 | Bryczkowski | ........ | G06F 3/1446 345/1.3 |
| 2017/0017453 A1* | 1/2017 | Hoshino | .............. | G02B 5/0278 |

FOREIGN PATENT DOCUMENTS

| | | |
|---|---|---|
| JP | 2005-091873 A | 4/2005 |
| JP | 2013-130779 A | 7/2013 |
| WO | WO-2015146319 A1 * 10/2015 | ........... G02B 5/0278 |

* cited by examiner

*Primary Examiner* — Michael Pervan
(74) *Attorney, Agent, or Firm* — Studebaker & Brackett PC

(57) ABSTRACT

A display device includes: a plurality of display panels, which is capable of displaying images independently; a protection plate, which is disposed on a front surface of the plurality of display panels; and a transparent adhesive, which covers a display surface of each of the plurality of display panels to adhere the display panels to the protection plate, wherein the plurality of display panels includes: a pair of substrates, on which plural wirings and plural electrodes are formed, a driver circuit, which inputs signals to the plural wirings to drive the plural electrodes, and a detection circuit, which detects an abnormal value of signals output from the display panels.

11 Claims, 4 Drawing Sheets

US 10,467,934 B2

DISPLAY DEVICE

CROSS-REFERENCE TO RELATED APPLICATION

This application claims priority from Japanese Patent Application No. 2016-155281 filed on Aug. 8, 2016, the entire subject matter of which is incorporated herein by reference.

TECHNICAL FIELD

This disclosure relates to a display device including a plurality of display panels which display images.

BACKGROUND

Generally, a display device includes a display panel which displays an image and a backlight which irradiates light to the display panel.

A liquid crystal display panel, which is an example of the display panel, is configured such that a first substrate on which a pixel and a pixel electrode are formed and in which a plurality of wiring lines are formed in a matrix structure, and a second substrate are disposed to face each other, and a liquid crystal is sandwiched between the substrates. In addition, a polarizing plate is attached to the surface of the substrate of the liquid crystal display panel.

An image is displayed by sequentially applying scanning signals to scanning wiring lines arranged in a horizontal direction, among the plurality of wiring lines formed in the first substrate, and sequentially applying predetermined signal voltages to signal wiring lines arranged in a vertical direction, thereby applying a display voltage to the corresponding pixel electrode.

The displayed image is visibly recognized by an observer by irradiation of light from the backlight which is installed on a back side of the liquid crystal display panel.

A liquid crystal display device configured by the liquid crystal display panel is used for a variety of purposes, for example, a display for a personal computer, display devices used for industrial applications, an in-vehicle display device, display devices used in outdoor such as handy terminals and displays for advertisement. Further, the liquid crystal display device is also used in a display device which includes a plurality of display screens and shows different displays or same displays on each of the screens. In JP-A-2005-91873 and JP-A-2013-130779, the configuration of including a plurality of display screens of the display device is disclosed.

SUMMARY

In the display device disclosed in JP-A-2005-91873, panels are joined by a mold material and polarizing plates are attached on both sides. In the display device disclosed in JP-A-2013-130779, a plurality of display units are connected by an adhesive layer such as a connection sheet, and protection plates are disposed at the front side of the display units.

In such a display device including a plurality of display screens, a problem that an image cannot be displayed on the display panel due to a failure of the display panel may be caused. If the image is not normally displayed on the display panel, failure may be caused depending on a usage propose.

This disclosure is to provide a display device which includes a plurality of display screens and detects a state where an image cannot be displayed on a display panel.

A display device includes: a plurality of display panels, which is capable of displaying images independently; a protection plate, which is disposed on a front surface of the plurality of display panels; and a transparent adhesive, which covers a display surface of each of the plurality of display panels to adhere the display panels to the protection plate, wherein the plurality of display panels includes: a pair of substrates, on which plural wirings and plural electrodes are formed, a driver circuit, which inputs signals to the plural wirings to drive the plural electrodes, and a detection circuit, which detects an abnormal value of signals output from the display panels.

According to the above described display device, since the detection circuit which detects an abnormal value of the signal output from the display panel is provided, it is possible to detect the display panel on which the image is not normally displayed among the plurality of display panels.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
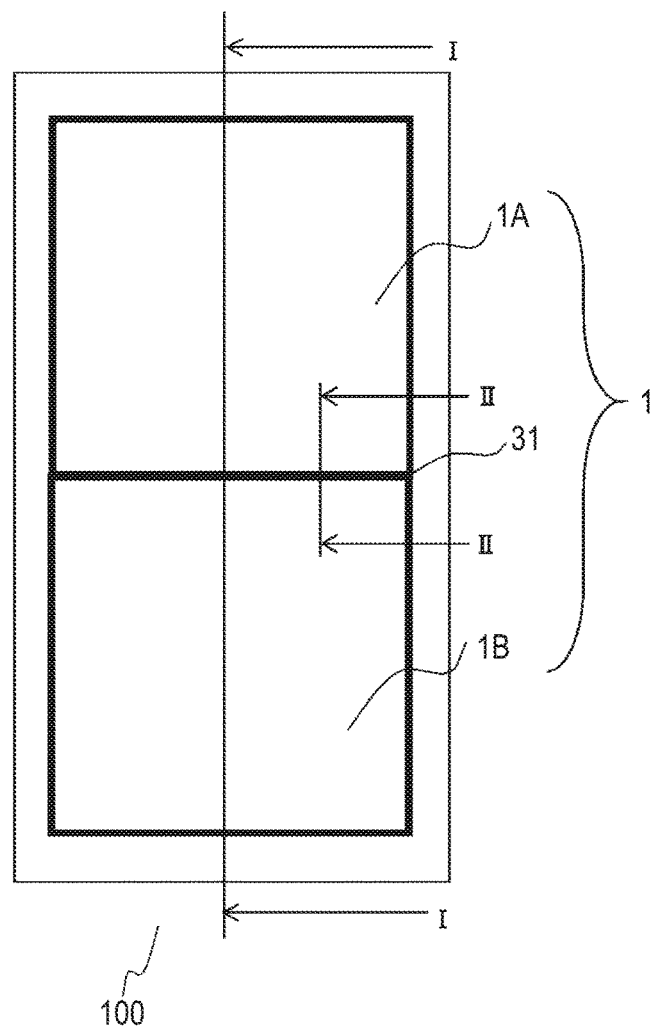
FIG. 1 is a front view of a display device of this disclosure.

A structure of a display device of this disclosure will be described below with reference to the accompanying drawings. In the embodiments, the same reference numerals denote the same or substantially the same components.

<First Embodiment>

Figure 2:
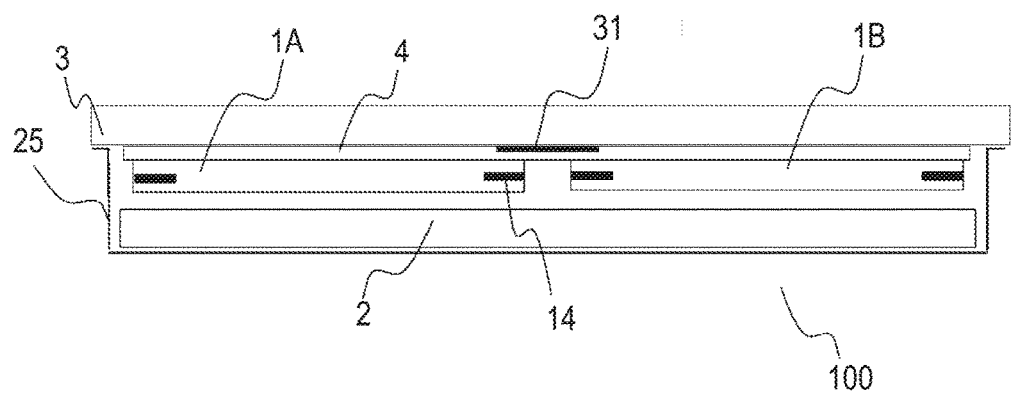
FIG. 2 is a cross-sectional view taken along line I-I of the display device illustrated in FIG. 1.
Figure 3:
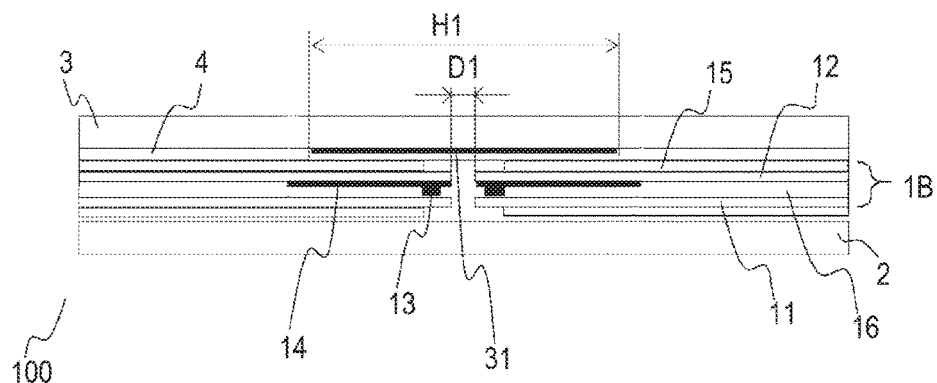
FIG. 3 is a cross-sectional view taken along line II-II of the display device illustrated in FIG. 1.
Figure 4:
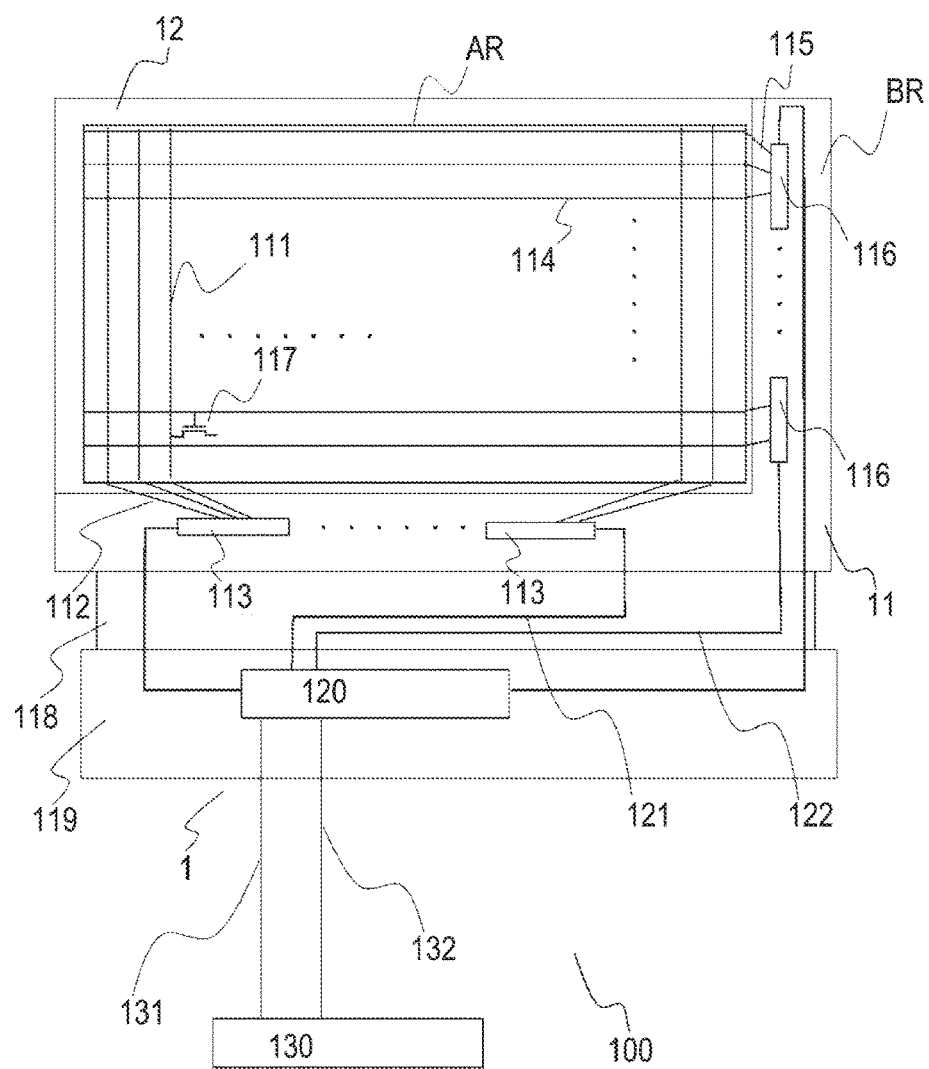
FIG. 4 is a front view of a display panel configuring the display device of this disclosure.
Figure 5:
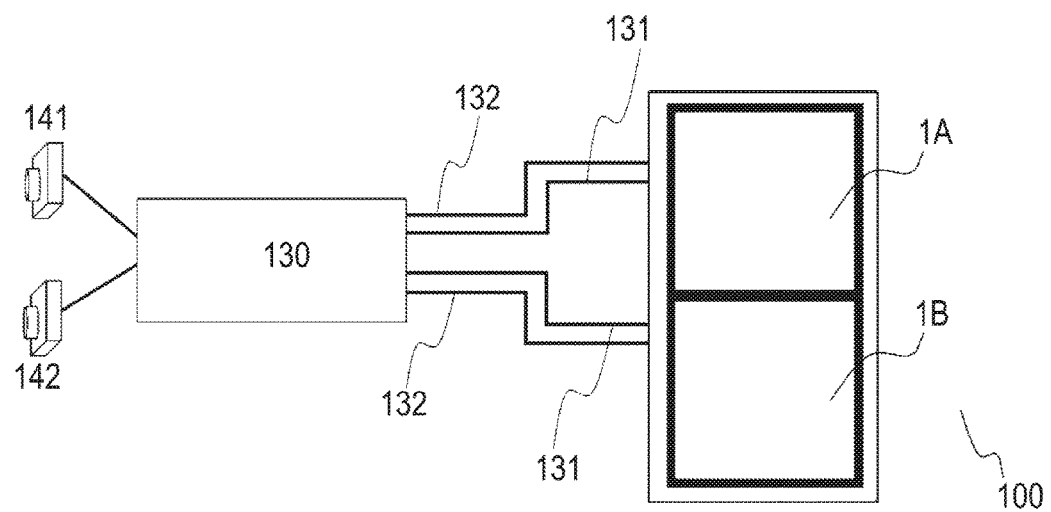
FIG. 5 is a schematic view of the display device of this disclosure.
Figure 6:
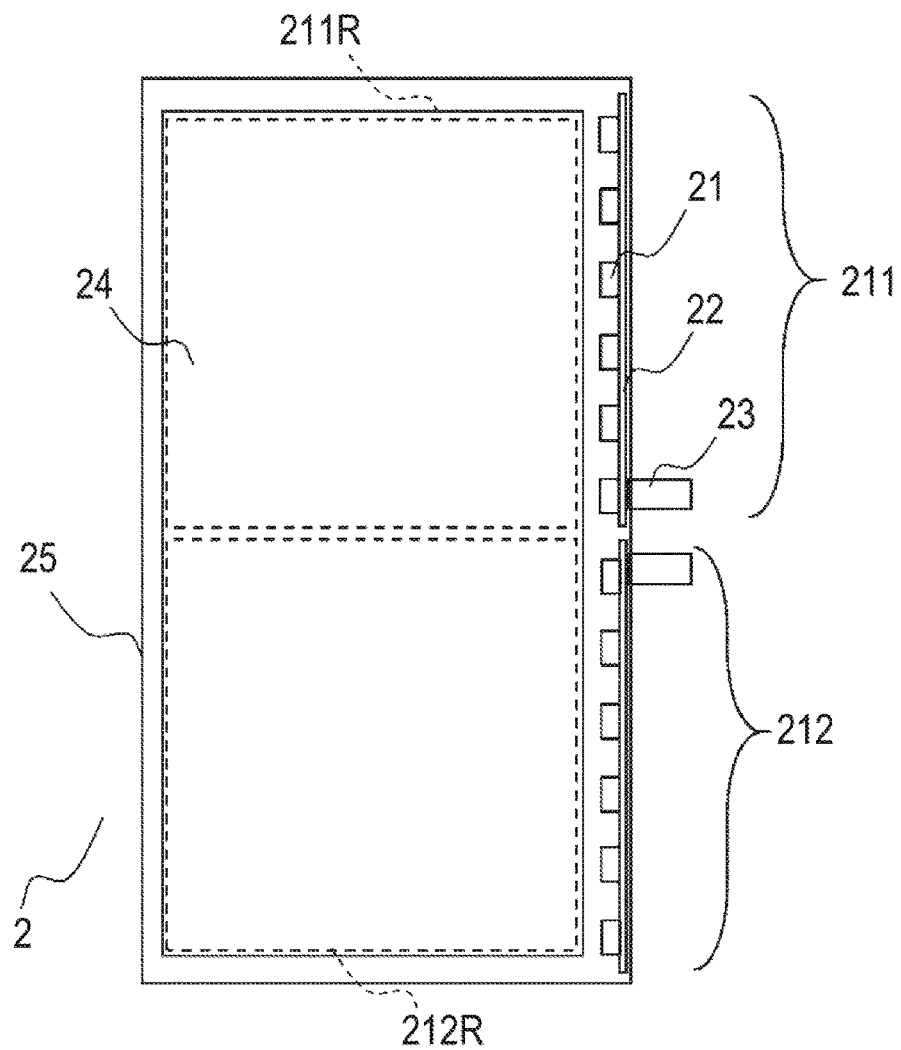
FIG. 6 is a front view a backlight configuring the display device of this disclosure.

FIG. 1 is a front view of a display device of this disclosure, FIG. 2 is a cross-sectional view taken along line I-I of the display device illustrated in FIG. 1, FIG. 3 is a cross-sectional view taken along line II-II of the display device illustrated in FIG. 1, FIG. 4 is a front view of a display panel configuring the display device of this disclosure, FIG. 5 is a schematic view of the display device of this disclosure, and FIG. 6 is a front view a backlight configuring the display device of this disclosure.

In FIGS. 1 to 4, a display device 100 of this disclosure includes two display panels 1 of a first display panel 1A and a second display panel 1B in which side surfaces thereof are disposed to face each other, and a backlight 2 disposed on a non-display surface, which is a surface opposite to a display surface of the display panel 1, to irradiate the display panel 1 with light. The display device 100 further includes a protection plate 3 disposed on the display surface of the plurality of display panels 1 to protect the display panels 1.

In the first embodiment, a transparent adhesive 4 is disposed on the display surface of two display panels 1, whereby the first display panel 1A and the second display panel 1B are coupled to each other. The backlight 2 is disposed on the non-display surface of the display panel 1 so that the backlight 2 is disposed to be integrally formed even when a plurality of display panels 1 are disposed. In addition, a circuit board 119 including a driver circuit (timing controller 120) is disposed on a back surface of the display device 100, the driver circuit being configured to input a signal to the display panel 1.

<Display Panel>

In FIG. 3 or 4, the display panel 1 is made up of, for example, transmission or semi-transmission liquid crystal display panels. The display panel 1 includes a first substrate 11 having a thin film transistor (TFT), a pixel electrode and the like formed on an insulating substrate such as glass, the TFT serving as a switching element, and a second substrate 12 having a color filter (CF), a black matrix 14 formed for light shielding, a counter electrode and the like. Further, the display panel 1 includes a sealing material 13 used to adhere the first substrate 11 and the second substrate 12, a liquid crystal 16 sandwiched between both substrates, an alignment film (not illustrated) used to align molecules of the liquid crystal 16, and a polarizing plate 15 disposed on an outer surface of both substrates. Between the first display panel 1A and the second display panel 1B, a black-frame printing portion 31 is disposed on the back surface of the protection plate 3. The black-frame printing portion 31 is formed with a width H1 longer than a distance D1 from an inner end of the black matrix 14 formed on the first display panel 1A to an inner end of the black matrix 14 formed on the second display panel 1B, and shields light which may be visually recognized between the first display panel 1A and the second display panel 1B.

The display panel 1 will be further described with reference to FIG. 4. On the first substrate 11, a display region AR and a frame region BR adjacent to the display region AR are defined. In the display region AR, a plurality of source wirings 111 and a plurality of gate wirings 114 intersecting with each other are arranged in a plan view. The plurality of source wirings 111 are electrically insulated from the plurality of gate wirings 114 by insulating films (not illustrated) arranged therebetween. In addition, a plurality of electrodes (TFTs) 117 are formed at intersection portions between the plurality of source wirings 111 and the plurality of gate wirings 114.

In the frame region BR, source connection wirings 112 electrically connected to the source wirings 111 and source ICs 113 serving as driving ICs (Integrated Circuits) connected to the source connection wirings 112 are disposed. In addition, gate ICs 116 are disposed in the frame region BR to be connected to gate connection wirings 115 electrically connected to the gate wirings 114. The source ICs 113 supply a driving video signal to the plurality of source wirings 111. The gate ICs 116 supply a scanning signal to the plurality of gate wirings 114. The driving ICs are cascade-connected as illustrated in FIG. 4.

A circuit board 119 is connected to the first substrate 11 via a flexible printed circuit (FPC) 118 which is a flexible wiring board. On the circuit board 119, a timing controller 120 is mounted to input a signal to the source ICs 113 and the gate ICs 116. The timing controller 120 is connected to an image processing device 130, and receives a signal to be input to the display panel 1 via a signal input wiring 131.

The tinting controller 120 supplies a video signal to the source IC 113. Further, the timing controller 120 supplies a scanning signal to the gate ICs 116. The source ICs 113, to which the video signal, is supplied sequentially send signals by an internal shift register (not illustrated), hold data corresponding to the source wirings 111, and output an analog voltage to the source wirings 111. The gate ICs 116, to which the scanning signal is supplied, sequentially send signals by an internal shift register (not illustrated) and output gate outputs corresponding to the gate wirings 114.

The final signal sent from the internal shift register of the source IC 113 is sent to the timing controller 120 by a source detection wiring 121 connected to the source IC 113 disposed at the terminal. Similarly, the final signal sent from the shift register of the gate IC 116 is sent to the timing controller 120 by a gate detection wiring 122 connected to the gate IC 116 disposed at the terminal. The timing controller 120 monitors whether the signals sent from the source detection wiring 121 and the gate detection wiring 122 are output at normal timing. In a case where the signals are not output at the normal timing, or in a case where the final signal is not detected, that is, there is an abnormal value, the timing controller 120 determines whether there is a failure signal. When it is determined that there is the failure signal, information is sent to the image processing device 130 via the signal detection wiring 132. When receiving the information of the failure signal, the image processing device 130 stops inputting the signal to the display panel 1.

FIG. 5 is a schematic diagram illustrating the display device 100 of this disclosure. The display device 100 of this disclosure includes the plurality of display panels 1, and the signal input wiring 131 and the signal detection wiring 132 are connected to the respective display panels 1, that is, the first display panel 1A and the second display panel 1B. In the display device 100 of this disclosure, as described above, when the information of the failure signal is sent from the first display panel 1A through the signal detection wiring 132, the image processing device 130 stops inputting the signal to the first display panel 1A from the signal input wiring 131. Similarly, even in the second display panel 1B, the detection of the failure signal is performed. The image processing device 130 is provided with a control function, by which when the information of the failure signal is not sent to the second display panel 1B, a predetermined signal is selected in the image processing device 130 and the selected signal is inputted to the second display panel 1B through the signal input wiring 131. Since the predetermined signal is selected and the selected signal is input to the second display panel 1B, from which the failure signal is not to be sent, it is possible to display a desired image and information to be preferentially displayed. Both signals of the first display panel 1A, from which the failure signal is sent, and the second display panel 1B are input to the second display panel 1B, from which the failure signal is not sent, and thus it is also possible to display an image by dividing it. Further, the image processing device 130 may have a switching function for inputting a desired signal to the second display panel 1B, from which the failure signal is not sent, and may manually control it separately.

In the display device 100 of this disclosure, a first camera 141 and a second camera 142 for capturing an image may be connected to the image processing device 130. In a normal state, an image captured by the first camera 141 is sent to the first display panel 1A from the signal input wiring 131 via the image processing device 130, and is displayed on the first display panel 1A. Similarly, an image captured by the second camera 142 is sent to the second display panel 1B from the signal input wiring 131 via the image processing device 130, and is displayed on the second display panel 1B.

If the information of the failure signal is received from the first display panel 1A, the image processing device 130 stops inputting the signal to the first display panel 1A, that is, stops displaying the image of the first camera 141. At the same time, if the image processing device 130 is controlled to select the image of the first camera 141 as a predetermined signal, the image captured by the first camera 141 is displayed on the second display panel 1B. On the other hand, if the image processing device 130 is controlled to select the image captured by the second camera 142, the image captured by the second camera 142 is displayed on the second display panel 1B.

<Backlight>

FIG. 6 is a front view of the backlight 2 mounted on the display device 100 of this disclosure. In FIG. 6, the backlight 2 includes light source units 211 and 212 configured by a light source substrate 22 respectively having a light source 21 that emits light and an LED-FPC 23 that supplies power to the light source 21. The LED-FPC 23 is connected to a connector (not illustrated), and the light source 21 is turned on by power supply. The backlight 2 includes a plurality of systems corresponding to an irradiation region 211R of the first display panel 1A and an irradiation region 212R of the second display panel 1B, and can control the irradiation regions by controlling the power supply to the first light source unit 211 and the second light source unit 212. Further, the power supply to the light source units 211 and 212 can be controlled in conjunction with a control function for the display panel 1 disposed in the image processing device 130 described above. In FIG. 6, the light source substrate 22 is divided, but the light source substrate 22 may be integrally formed without being divided as long as it has a plurality of systems. In the case where the display panel 1 of the display device 100 is configured with a horizontal electric field type in which an electric field of the liquid crystal 16 is controlled in a horizontal direction, when the input of the signal to the display panel 1 is stopped, transmissivity or reflectivity becomes minimum when no voltage is applied to the liquid crystal 16 and a screen become black, and thus it is not necessary to control the power supply to the light source units 211 and 212. However, it is possible to reduce power consumption by controlling the power supply to the light source units 211 and 212.

Further, the backlight 2 includes a light guide plate 24 having a light-emitting surface through which light emitted from the light source 21 is incident from a side surface and propagates to a front surface and a counter light-emitting surface positioned at a side opposite to the light-emitting surface. The backlight 2 may include a plurality of optical sheets that are disposed on the light-emitting surface of the light guide plate 24 so as to control distribution and spread of the light emitted from the light guide plate 24 and a reflector that allows the light coming out of the counter light-emitting surface of the light guide plate 24 to be directed toward the light guide plate 24 again.

<Light Source/Light Source Substrate>

As the light source 21, a point light source of RGB (three primary colors of Red, Green, and Blue), LEDs emitting colors other than RGB, or a fluorescent lamp (not illustrated) is disposed. In the case of using the point light source, the light source substrate 22, on which the point light source is mounted, may be made using a general glass epoxy resin as a base, or a flexible flat cable may be used. In order to enhance heat dissipation properties, alternatively, the substrate may be made using a metal such as aluminum or ceramic as a base. The light source 21 and the light source substrate 22 are held by a frame 25, for example.

<Light Guide Plate>

The light guide plate 24 is made of, for example, a transparent acrylic resin, a polycarbonate resin, or glass, and at least one of the counter light-emitting surface and the light-emitting surface of the light guide plate 24 has a scattering dot pattern provided thereon or a prism shape to emit light and adjust light intensity distribution in the surface and a light emitting direction.

<Frame>

As illustrated in FIG. 2, the optical member configuring the backlight 2 is formed to have such a size that the side surfaces of the plurality of first display panel 1A and the second display panel 1B are connected to face each other, and is held by the frame 25. Accordingly, the interval between the display panels 1 can be narrowed as compared with the case where the respective frames (not illustrated) corresponding to the first display panel 1A and the second display panel 1B are connected to each other. Since the interval between the display panels 1 can be narrowed, it is possible to prevent seams from becoming wider and causing a sense of discomfort in the case where the display device is used for displaying an image of one screen on the plurality of display panels 1.

In addition, the frame 25 holds the first display panel 1A and the second display panel 1B therein, and is fixed to a peripheral portion of the back surface of the protection plate 3. For this reason, when an external impact is applied to the rear surface of the display device 100, stress is hardly delivered to the first display panel 1A and the second display panel 1B. Therefore, it is possible to prevent the first display panel 1A and the second display panel 1B from being broken.

As described above, according to the display device 100 of this disclosure, on the display surface of the plurality of display panels 1, the transparent adhesive 4 is disposed to connect the plurality of display panels 1 to each other and the protection plate 3 is disposed. Thus, the front surface of the display panel 1 is protected, and the breakage of the display panels disposed in plural form can be prevented. Further, the timing controller 120 disposed on the display panel 1 monitors whether the signal sent from the detection wiring 121 or 122 connected to the source IC 113 or the gate IC 116 is output to the plurality of display panels 1 at the normal timing. In this way, it is possible to detect a state where the image cannot be normally displayed on the display panel 1.

In the case where the signals are not output at the normal timing, or in the case where the final signal is not detected, that is, there is an abnormal value, the timing controller 120 determines whether there is a failure signal. When it is determined that there is the failure signal, information is sent to the image processing device 130 via the signal detection wiring 132. Since the image processing device 130 is provided with the control function, by which when the information of the failure signal is received, the input of the signal to the display panel 1 is stopped, the image processing device 130 can notify the user of the presence or absence of the failure of the display device 100.

In addition, the detection of the failure signal is also performed in the second display panel 1B of the plurality of display panels 1. However, since the image processing device 130 is provided with the control function, by which when the information of the failure signal is not sent to the second display panel 1B, the predetermined signal in the image processing device 130 is selected and the selected signal is inputted to the second display panel 1B through the signal input wiring 131, it is possible to display a desired image and information to be preferentially displayed on one display panel, from which the failure signal is not sent, even when the display device 100 has a failure.

Further, the first camera 141 and the second camera 141, which capture images on the image processing device 130, are connected to the display device 100. If the information of the failure signal is received from the first display panel 1A, the image processing device 130 stops inputting the signal to the first display panel 1A. At the same time, if the image processing device 130 is controlled to select the image of the first camera 141 as a predetermined signal, the image captured by the first camera 141 is displayed on the second display panel 1B. According to this setting, it is possible to display a desired image and information to be preferentially displayed on one display panel, from which the failure signal, is not sent even when the display device 100 has a failure.

Since the display device 100 includes the backlight 2 and is configured integrally with the frame 25 to hold the optical members corresponding to the respective display panels 1, the interval between the display panels 1 can be narrowed as compared with the case where the respective frames corresponding to the first display panel 1A and the second display panel 1B is provided. Further, since the frame 25 is fixed to the peripheral portion of the protection plate 3, stress can be hardly delivered to the first display panel 1A and the second display panel 1B when the external impact is applied to the display device 100, and the breakage of the first display panel 1A and the second display panel 1B can be prevented.

In addition, the backlight 2 includes the plurality of systems corresponding to an irradiation region 211R of the first display panel 1A and an irradiation region 212R of the second display panel 1B, and can control the irradiation regions by controlling the power supply. Further, the backlight is controlled to turn on the light source in conjunction with the control function for the display panel 1 disposed in the image processing device 130, and thus it is possible to stop the power supply to the display panel having a failure and to reduce power consumption.

<Second Embodiment>

Figure 7:
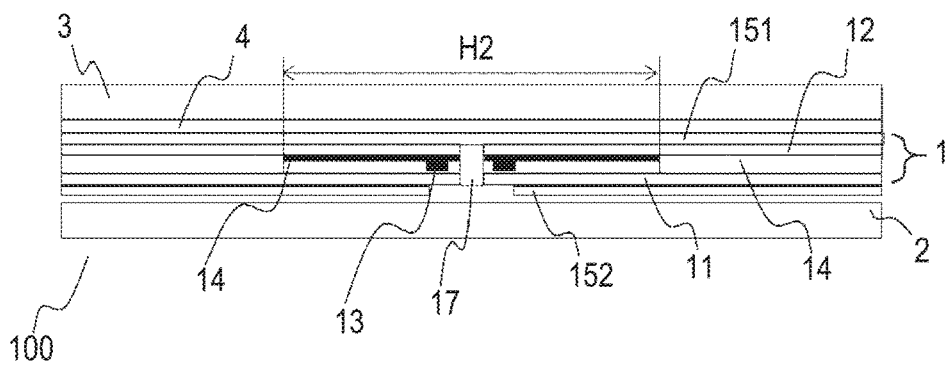
FIG. 7 is a cross-sectional view of a display device according to a second embodiment of this disclosure.

FIG. 7 is a cross-sectional view of a display device 100 according to a second embodiment of this disclosure. In the first embodiment, the display device 100 has a structure in which the transparent adhesive 4 is disposed on the display surface of the plurality of display panels 1 to connect the plurality of display panels 1 with each other, whereby the protection plate 3 is disposed. However, the display device 100 according to the second embodiment is configured such that, instead of disposing the polarizing plate on each of both substrates, a polarizing plate 151 is disposed to face the second substrate 12 to be corresponding to the plurality of display panels 1 as one sheet. In addition, a resin material 17 is disposed on the side surface of the display panels 1, between the plurality of display panels 1, to shield the light from between the display panels 1.

According to the display device 100 in the second embodiment, the polarizing plate 151 is disposed to be corresponding to the plurality of display panels as one sheet so that peeling from the transparent adhesive 4 or the like, which occurred when the plurality of display panels 1 are attached to the transparent adhesive 4, at the end of the polarizing plate 15 can be prevented. In addition, it is unnecessary to dispose the black-frame printing portion 31 formed at the time when the plurality of display panels 1 are attached to the protection plate 3 in the first embodiment. Further, since it is unnecessary to have a margin for positioning the black-frame printing portion 31 and the polarizing plate 151 with respect to the display panels 1A and 1B, the width H2 between the plurality of display panels 1 can be narrowed as compared to the first embodiment. By disposing a polarizing plate 152 disposed on the surface of the first substrate 11 to be corresponding to each of the display panels 1A and 1B, it is possible to dispose the resin material 17 even after the display panels 1A and 1B are attached to the protection plate 3.

As described above, the display device of this disclosure can be applied to an active matrix type liquid crystal display device and an organic electroluminescence display device.

It is understood that the respective embodiment of this disclosure can be freely combined within the scope of this disclosure. Alternatively, the respective embodiments can appropriately be modified and omitted.

What is claimed is:

1. A display device, comprising:
    a plurality of display panels, each of the plurality of display panels capable of displaying images independently;
    a protection plate, which is disposed on a front surface of the plurality of display panels; and
    a transparent adhesive, which covers a display surface of each of the plurality of display panels to adhere the display panels to the protection plate,
    wherein each of the plurality of display panels includes:
        a pair of substrates, on which plural wirings and plural electrodes are formed,
        a driver circuit, which inputs signals to the plural wirings to drive the plural electrodes, and
        a detection circuit, which detects an abnormality in at least one of a case where the signals are not output at a normal timing and a case where a final signal output from an internal shift register is not detected.

2. The display device according to claim 1, wherein
    the detection circuit is provided to each of the display panels independently, and wherein
    when the detection circuit detects the abnormality, a control function stops inputting signals to the display panel in which the abnormality is detected.

3. The display device according to claim 2, wherein
    the control function includes a selecting function to selectively permit inputting of a predetermined signal to a display panel of the plurality of display panels, in which the abnormality is not detected.

4. The display device according to claim 3, wherein
    the display device is connected with a plurality of cameras for displaying images on the plurality of display panels, and wherein
    the selecting function is configured to stop inputting the signals to the display panel in which the abnormality is detected, and to selectively input a predetermined image displaying signal, which is input from a camera of the plurality of cameras, to the display panel in which the abnormality is not detected.

5. The display device according to claim 1, wherein
    the display device further comprises a backlight and a frame, wherein
    the backlight irradiates the plurality of display panels with light,
    the backlight includes an irradiation region corresponding to the plurality of display panels, and
    the frame is formed as an integral unit and contains the plurality of display panels and an optical member configuring the backlight.

6. The display device according to claim 5, wherein the frame is fixed to a peripheral portion of the protection plate.

7. The display device according to claim 5, wherein the backlight includes a plurality of irradiation regions, wherein each of the plurality of irradiation regions is configured to irradiate a respective one of the plurality of display panels with light, and wherein
the backlight has a plurality of lighting systems to turn on a light source, wherein each of the plurality of lighting systems corresponds to a respective one of the plurality of irradiation regions.

8. The display device according to claim 7, wherein when the signal output from the driver circuit to the plural wirings has the abnormality, a control function stops the lighting system for turning on the light source of the irradiation region corresponding to the display panel in which the abnormality is detected.

9. The display device according to claim 1, wherein the display panel is a horizontal electric field type panel.

10. The display device according to claim 1, wherein the display panels each include a polarizing plate which is attached to a front surface of the substrate, and the polarizing plate on the display surface is formed in one sheet and is disposed to connect each of the display panels.

11. The display device according to claim 10, wherein a light shielding member is disposed on ends of the display panels, between the display panels.

\* \* \* \* \*